(12) United States Patent
Liu et al.

(10) Patent No.: US 11,828,906 B2
(45) Date of Patent: Nov. 28, 2023

(54) MEASURING DEVICE FOR SNOW FLUX AND ACCUMULATED SNOW DENSITY AT DIFFERENT HEIGHTS

(71) Applicant: SHIJIAZHUANG TIEDAO UNIVERSITY, Shijiazhuang (CN)

(72) Inventors: Qingkuan Liu, Shijiazhuang (CN); Haifei Li, Shijiazhuang (CN); Feiqiang Li, Shijiazhuang (CN); Shuyong He, Shijiazhuang (CN); Wenyong Ma, Shijiazhuang (CN); Xiaobing Liu, Shijiazhuang (CN); Yaya Jia, Shijiazhuang (CN); Zihan Cui, Shijiazhuang (CN)

(73) Assignee: SHIJIAZHUANG TIEDAO UNIVERSITY, Shijiazhuang (CN)

( * ) Notice: Subject to any disclaimer, the term of this patent is extended or adjusted under 35 U.S.C. 154(b) by 205 days.

(21) Appl. No.: 17/599,180

(22) PCT Filed: Jan. 11, 2021

(86) PCT No.: PCT/CN2021/071034
§ 371 (c)(1),
(2) Date: Sep. 28, 2021

(87) PCT Pub. No.: WO2022/012003
PCT Pub. Date: Jan. 20, 2022

(65) Prior Publication Data
US 2022/0317334 A1    Oct. 6, 2022

(30) Foreign Application Priority Data

Jul. 16, 2020   (CN) .......................... 202010683504.3

(51) Int. Cl.
*G01W 1/14* (2006.01)
*G01N 9/04* (2006.01)
*G01W 1/02* (2006.01)

(52) U.S. Cl.
CPC ................. *G01W 1/14* (2013.01); *G01N 9/04* (2013.01); *G01W 1/02* (2013.01)

(58) Field of Classification Search
CPC ........... G01W 1/14; G01W 1/10; G01W 1/02; G01W 2203/00; G01N 9/02;
(Continued)

(56) References Cited

U.S. PATENT DOCUMENTS

| 5,291,779 A * | 3/1994 | Govoni | .................... G01W 1/14 73/863.52 |
| 5,918,277 A * | 6/1999 | Yilmaz | .................... G01W 1/14 73/170.05 |
| 2015/0168600 A1* | 6/2015 | Zheng | .................... G01W 1/00 73/170.16 |

FOREIGN PATENT DOCUMENTS

| CN | 201050996 Y | 4/2008 |
| CN | 201514312 U * | 6/2010 |

(Continued)

OTHER PUBLICATIONS

Inoue, M.; Fujino, K. (1976). (scientific paper). Measurements of Drifting Snow at Mizuho Camp, East Antarctica, 1974-1975 (pp. 1-12). Kita-ku, Sapporo. (Year: 1976).*

(Continued)

*Primary Examiner* — Daniel R Miller
*Assistant Examiner* — Eric Sebastian Von Wald
(74) *Attorney, Agent, or Firm* — Silver Legal LLC; Jarrett L. Silver (57) ABSTRACT

A measuring device for snow flux and accumulated snow density at different heights, which comprises a shell, a plurality of collection devices and a support frame, the first (Continued)

side of the shell is provided with a plurality of collection ports along the height direction of the shell; each collection device comprises a collection pipe, a storage pipe and a fixed bolt, the first end of the collection pipe is horizontally arranged, the first end of one collection pipe is arranged in one collection port, both the second end of the collection pipe and the storage pipe are obliquely arranged downwards, the second end of the collection pipe and the first end of the storage pipe are detachably connected and communicate with each other; and the shell is detachably connected with the support frame.

9 Claims, 8 Drawing Sheets

(58) Field of Classification Search
CPC ....... G01N 2009/022; G01N 2009/024; G01N 9/00; G01N 15/06; G01N 15/0606; G01N 2015/0693; G01N 9/04
See application file for complete search history.

(56) References Cited

FOREIGN PATENT DOCUMENTS

| | | | |
|---|---|---|---|
| CN | 203324496 U | 4/2013 | |
| CN | 203658010 U | 6/2016 | |
| CN | 106226547 A | * 12/2016 | ................ G01P 1/00 |
| CN | 109683210 A | 4/2019 | |
| CN | 209311718 U | 8/2019 | |
| CN | 111708104 A | 9/2020 | |

OTHER PUBLICATIONS

Trouvilliez, Alexandre et al., "A novel experimental study of aeolian snow transport in Adelie Land (Antarctica)", Cold Regions Science and Technology, Oct. 3, 2014, pp. 125-138, Issue 108, Elsevier, published online.
Jie Gao. International Search Report issued in PCT/CN2021/07103411, dated Apr. 20, 2021.
CNIPA Office Action issued in CN202010683504.3, dated Feb. 22, 2021.

* cited by examiner

MEASURING DEVICE FOR SNOW FLUX AND ACCUMULATED SNOW DENSITY AT DIFFERENT HEIGHTS

CROSS REFERENCE TO RELATED APPLICATION(S)

This patent application is a U.S. national stage application under 35 U.S.C. 371 of PCT/CN2021/071034, filed on Jan. 11, 2021, which claims the benefit of and priority to Chinese Patent Application No. 202010683504.3, filed on Jul. 16, 2020, the disclosure of which are incorporated by reference herein in its entirety as part of the present application.

TECHNICAL FIELD

The present disclosure relates to the technical fields of snow drift disaster prediction and prevention and control, and particularly relates to a measuring device for snow flux and accumulated snow density at different heights.

BACKGROUND ART

Drifting snow, also known as snow drift, is a natural phenomenon that accumulated snow or snowfall and restarted under the effect of wind, floats along with the wind, and finally accumulates. Snow drift not only causes the vision obstruction, which affects the sight of people, but also leads to the serious accumulated snow disaster. Consequently, serious damages can be caused to road traffic, house buildings, agricultural and animal husbandry production, electric power facilities and so on.

In the research and prevention of drifting snow disasters, snow flux and snow density at different heights are two very important parameters. These parameters are important indexes to judge the intensity of the snow drift, and are of great significance for the research and prevention of snow drift disasters.

The following problems exist in domestic and international studies: (1) the collection device used for snow particle collection in the existing measuring device is very inconvenient to disassemble and assemble; the whole measuring device needs to be disassembled before the collection devices can be taken out, resulting in very inconvenient weighing of snow particles; (2) the collection device is generally horizontally arranged, which makes the storage of the snow particles very inconvenient; and (3) the separation between the measuring device and the ground that caused by the horizontal support leads to low stability of the device in severe environments.

SUMMARY

In order to solve the above technical problems, the present disclosure provides a measuring device for snow flux and accumulated snow density at different heights, which is convenient for weighing snow particles, convenient for storage of snow particles, and has good stability in severe environments.

The present disclosure provides the following solutions to achieve the above purpose:

The present disclosure provides a measuring device for snow flux and accumulated snow density at different heights. The device comprises: a shell including multiple sides, a first side of the multiple sides is provided with a plurality of collection ports along a height direction of the shell; a plurality of partition plates; a plurality of collection devices arranged in the shell, each of the plurality of collection devices including a collection pipe with a first end and a second end, a storage pipe with a first end and a second end and a fixed bolt; a partition plate arranged between every two adjacent collection devices of the plurality of collection devices; and a support frame, wherein the first end of each collection pipe is horizontally arranged, the collection pipe and the collection port of the plurality of collection ports are in one-to-one correspondence, the first end of each collection pipe is arranged in one collection port of the plurality of collection ports, the second end of each collection pipe and each storage pipe are both obliquely arranged downwards, the second end of each collection pipe and the first end of each storage pipe are detachably connected and communicate with each other, the second end of each storage pipe is sealed, each fixed bolt penetrates through the shell and is fastened through a first nut, the second end of each storage pipe is supported on the fixed bolt, the shell is detachably connected with a support frame, and the support frame is detachably connected with ground.

Preferably, the second end of each collection pipe is embedded into the first end of each storage pipe, an air outlet gap is positioned between the second end of each collection pipe and the first end of each storage pipe, a plurality of air outlets are formed in the second side of the multiple sides along the height direction of the shell, the first side and the second side are oppositely arranged, the plurality of air outlets and the plurality of the collection devices are in one-to-one correspondence, and each of the plurality of air outlets corresponds to the second end of each storage pipe.

Preferably, the device also comprises a meteorological information collection assembly used for collecting meteorological information, and the meteorological information collection assembly is arranged on the support frame.

Preferably, the meteorological information collection assembly comprises an anemoclinograph.

Preferably, the device further comprises a mounting box, a mounting rack and positioning bolts, wherein the mounting box is fixedly connected with the mounting rack, an opening is formed in a top end of the mounting box, the anemoclinograph is inserted into the mounting box from the opening, the mounting rack is provided with a clamping slot, and the clamping slot is clamped to the support frame and fixedly connected with the support frame through the positioning bolts.

Preferably, both the third side of the multiple sides and each collection pipe are made of transparent materials, the third side is arranged between the first side and the second side, and two ends of the third side are fixedly connected with the first side and the second side respectively.

Preferably, scale lines are arranged on each collection pipe along an axis direction of the collection pipe.

Preferably, the support frame is fixedly connected with the ground through other bolts.

Preferably, the device further comprises a wind indicator.

Preferably, an auxiliary support is arranged on the support frame, an inverted U-shaped clamping part is defined by the auxiliary support and the support frame, the inverted U-shaped clamping part extends upwards a bottom end of the support frame along a height direction of the support frame, the shell is clamped in the inverted U-shaped clamping part, and the collection port and the air outlet are respectively formed in two opposite sides of the inverted U-shaped clamping part.

Compared with the prior art, the present disclosure has the following technical effects:

firstly, according to the measuring device for snow flux and accumulated snow density at different heights provided by the present disclosure, when snow particles need to be weighed, the storage pipes can be conveniently taken out by disassembling the fixed bolts, and the measuring device is convenient to weigh the snow particles;

secondly, according to the measuring device for snow flux and accumulated snow density at different heights provided by the present disclosure, the storage pipes are used for storing snow particles, the storage pipes are obliquely arranged downwards, compared with the horizontal arrangement, due to the fact that the storage pipes are obliquely arranged downwards, the snow particles in the storage pipes are not prone to being separated from the storage pipes under the influence of external airflow, the snow particles are convenient to store, and when the storage pipes are horizontally arranged, the snow particles are prone to being separated from the snow particle collection devices under the action of the external airflow; and thirdly, according to the measuring device for snow flux and accumulated snow density at different heights provided by the present disclosure, the shell is fixedly connected with the ground through the support frame, the shell stress is transmitted to the ground through the support frame, and the stability of the device is high in severe environments.

BRIEF DESCRIPTION OF THE DRAWINGS

To more clearly illustrate the embodiment of the present disclosure or the technical scheme in the prior art, the following briefly introduces the attached figures to be used in the embodiment. Apparently, the attached figures in the following description show merely some embodiments of the present disclosure, and those skilled in the art may still derive other drawings from these attached figures without creative efforts.

Reference signs in the attached figures: 1, shell; 101, first side; 102, third side; 2, collection port; 3, partition plate; 4, collection pipe; 5, storage pipe; 6, support frame; 7, air outlet gap; 8, air outlet; 9, fixed bolt; 10, anemoclinograph; 11, mounting box; 12, positioning bolt; 13, auxiliary support; 14, U-shaped clamping part; 15, fixed plate; 16, fixed rod; 17, fixed block; and 18, U-shaped clamping slot.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

The present disclosure aims to provide a measuring device for snow flux and accumulated snow density at different heights, which is convenient for weighing and storing snow particles and high in stability in severe environments.

In order to make the foregoing objective, features and advantages of the present disclosure clearer and more comprehensible, the present disclosure is further described in detail below with reference to the attached figures and specific embodiments.

Referring to FIG. 1 to FIG. 9, the device comprises: a shell 1 including multiple sides, a first side 101 of the multiple sides is provided with a plurality of collection ports 2 along a height direction of the shell 1; a plurality of partition plates; a plurality of collection devices arranged in the shell 1, each of the plurality of collection devices including a collection pipe 4 with a first end and a second end, a storage pipe 5 with a first end and a second end and a fixed bolt 9; a partition plate 3 arranged between every two adjacent collection devices of the plurality of collection devices; and a support frame 6, wherein the first end of each collection pipe 4 is horizontally arranged, the collection pipe 4 and the collection port 2 of the plurality of collection ports are in one-to-one correspondence, the first end of each collection pipe 4 is arranged in one collection port 2 of the plurality of collection ports, in the embodiment, specifically, the collecting port is adhered and fixed into the collection port 2 through glue, the second end of each collection pipe 4 and each storage pipe 5 are both obliquely arranged downwards, the second end of each collection pipe 4 and the first end of each storage pipe 5 are detachably connected and communicate with each other, the second end of each storage pipe 5 is sealed, each fixed bolt 9 penetrates through the shell 1 and is fastened through a first nut, the second end of each storage pipe 5 is supported on the fixed bolt 9, the shell 1 is detachably connected with a support frame 6, and the support frame 6 is detachably connected with ground.

The measuring device is convenient to weigh snow particles, convenient to store snow particles and high in stability in severe environments.

Figure 6:
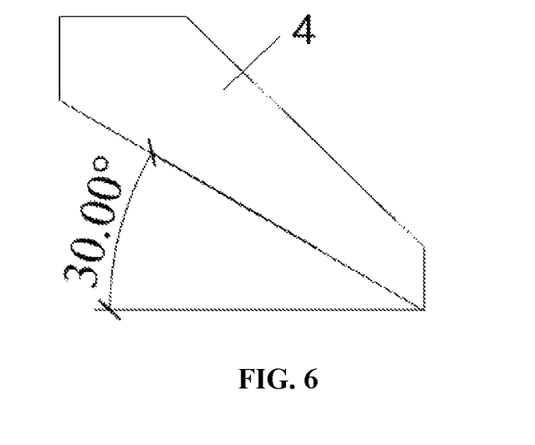
FIG. 6 is a structural schematic diagram of a collection pipe of a measuring device for snow flux and accumulated snow density at different heights provided in the embodiment of the present disclosure.

In the embodiment, to facilitate the condition that the snow particles entering the collection pipe 4 can better enter the storage pipe 5, the second end of the collection pipe 4 has an angle of 30° with respect to the horizontal direction, referring to FIG. 6, and specifically in the embodiment, the inclination direction of the storage pipe 5 coincides with the inclination direction of the collection pipe 4.

Figure 1:
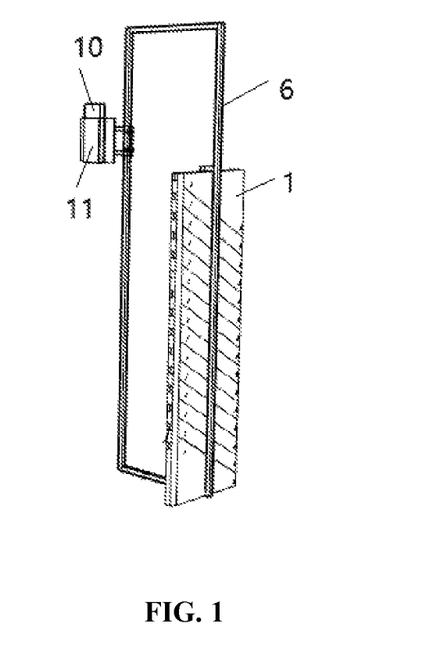
FIG. 1 is a first angle schematic diagram of a measuring device for snow flux and accumulated snow density at different heights provided in the embodiment of the present disclosure.
Figure 2:
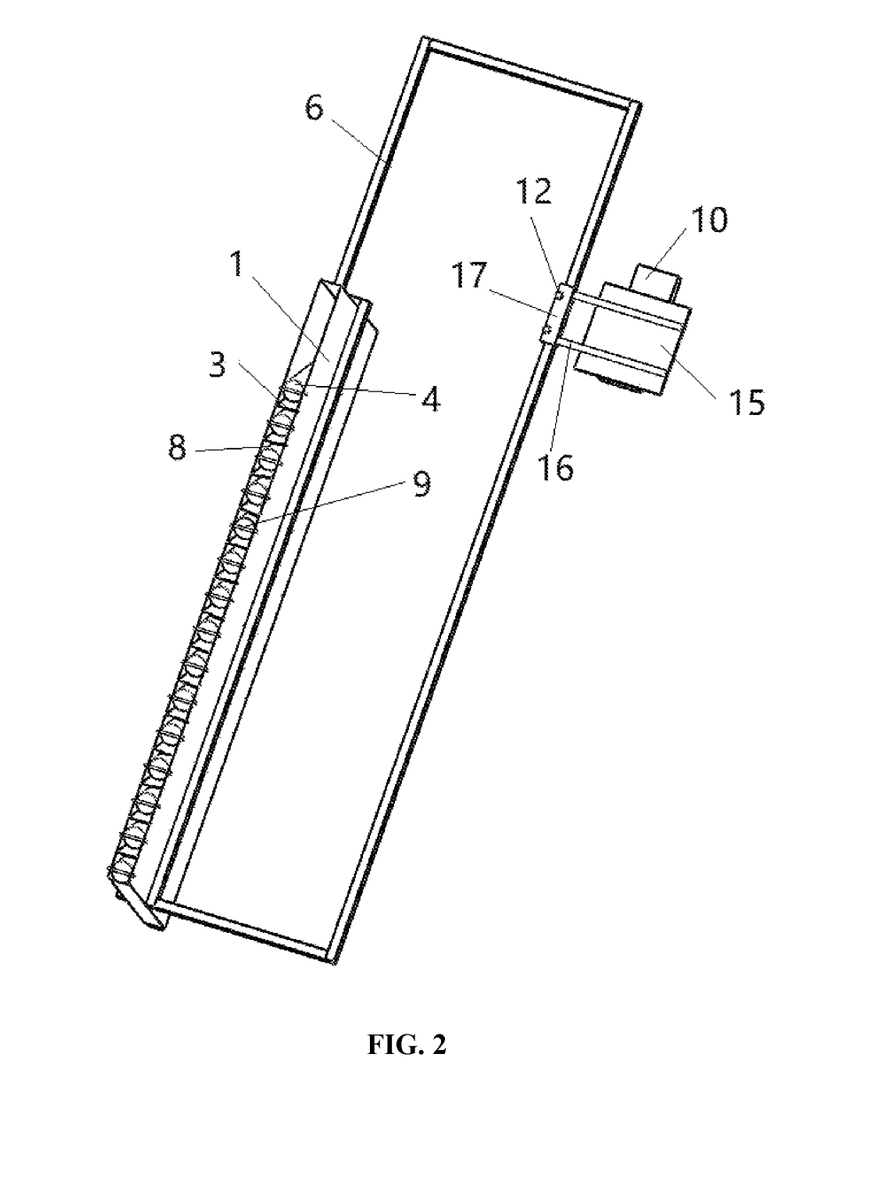
FIG. 2 is a second angle schematic diagram of a measuring device for snow flux and accumulated snow density at different heights provided in the embodiment of the present disclosure.
Figure 3:
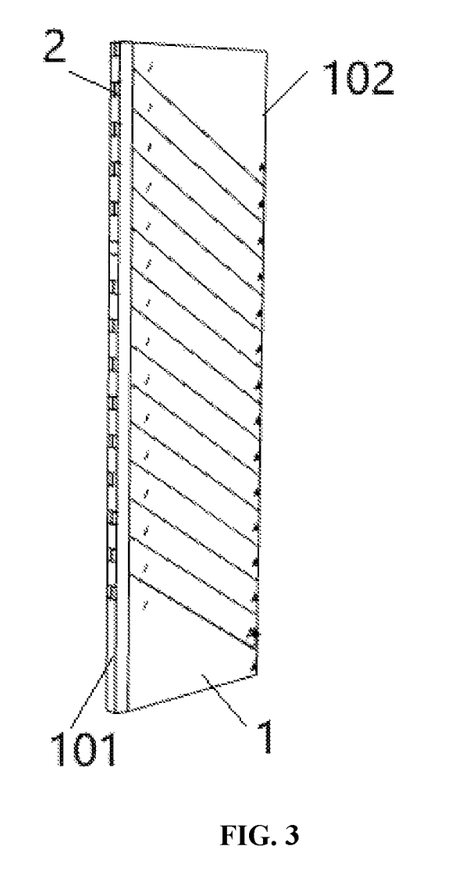
FIG. 3 is a structural schematic diagram of a measuring device for snow flux and accumulated snow density at different heights provided in the embodiment of the present disclosure.
Figure 4:
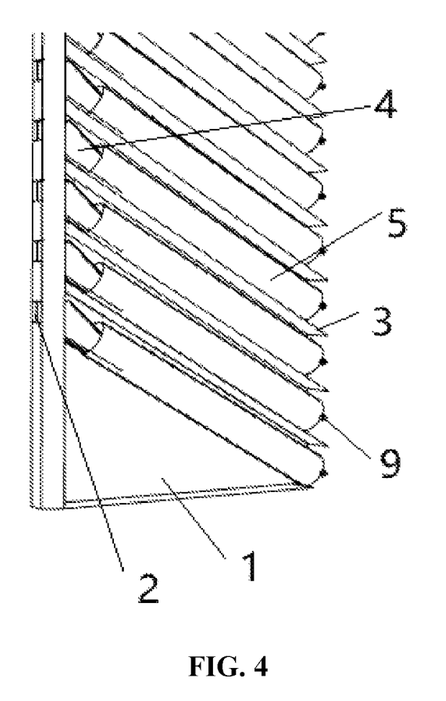
FIG. 4 is an internal structural schematic diagram of a measuring device for snow flux and accumulated snow density at different heights provided in the embodiment of the present disclosure.
Figure 5:
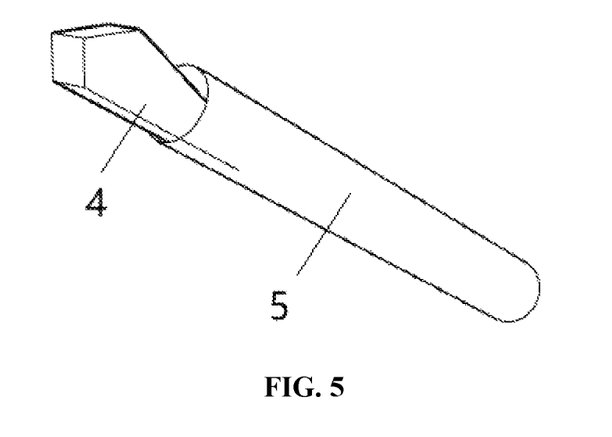
FIG. 5 is a structural schematic diagram of a collection device of a measuring device for snow flux and accumulated snow density at different heights provided in the embodiment of the present disclosure.

In the embodiment, as shown in FIG. 4, the second end of each collection pipe 4 is embedded into the first end of each storage pipe 5, an air outlet gap 7 is positioned between the second end 4 of each collection pipe and the first end of each storage pipe 5, a plurality of air outlets 8 are formed in the second side of the multiple sides along the height direction of the shell 1, the first side 101 and the second side are oppositely arranged, the plurality of air outlets 8 and the plurality of the collection devices are in one-to-one correspondence, and each of the plurality of air outlets 8 corresponds to the second end of each storage pipe 5. Thus, the snow particles are collected in the storage pipe 5, and airflow returns upwards after reaching the second end of the storage pipe 5, is discharged into the shell 1 from the air outlet gap 7 and is finally discharged through the air outlet 8.

In the embodiment, the device also comprises a meteorological information collection assembly used for collecting meteorological information, and the meteorological information collection assembly is arranged on the support frame 6. Thus, the snow flux and the accumulated snow density are combined with meteorological information, and snow drift disasters can be better researched through detection.

In the embodiment, specifically, the meteorological information collection assembly comprises an anemoclinograph 10. The anemoclinograph 10 can display meteorological information including wind speed, temperature and humidity in real time. At the same time, data can be recorded and imported into other electronic equipment, and the specific structure of the anemoclinograph 10 belongs to the prior art and is not repeated here.

Figure 7:
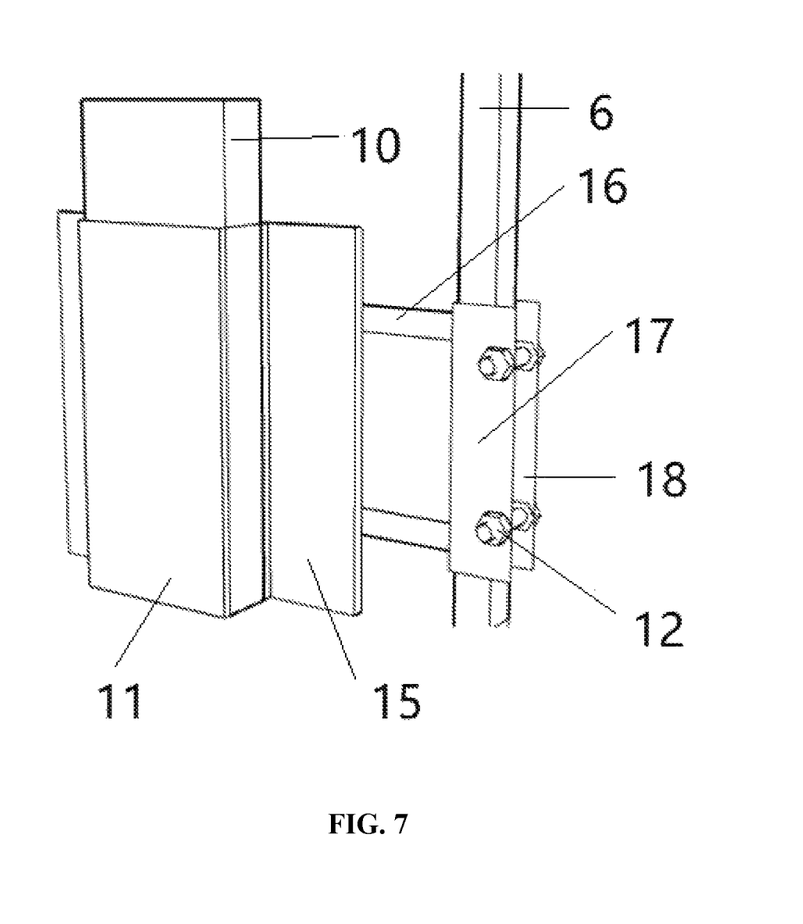
FIG. 7 is a setting mode schematic diagram of an anemoclinograph of a measuring device for snow flux and accumulated snow density at different heights provided in the embodiment of the present disclosure.

In the embodiment, as shown in FIG. 7, the device further comprises a mounting box 11, a mounting rack and positioning bolts 11, wherein the mounting box 11 is fixedly connected with the mounting rack, an opening is formed in a top end of the mounting box 11, the anemoclinograph 10 is inserted into the mounting box 11 from the opening, the mounting rack is provided with a clamping slot, and the clamping slot is clamped to the support frame 6 and fixedly connected with the support frame 6 through the positioning bolts 11. Through the arrangement, the anemoclinograph 10 is convenient to disassemble and assemble. Specifically, the mounting rack comprises a fixed plate 15, a fixed rod 16 and a fixed block 17, the mounting box 11 is fixedly connected with the fixed plate 15, the first end of the fixed rod 16 is fixedly connected with the fixed plate 15, the second end of the fixed rod 16 is fixedly connected with the fixed block 17, a U-shaped clamping slot 18 is formed in the side, away from the second end of the fixed rod 16, of the fixed block 17, the support frame 6 is clamped in the U-shaped clamping slot 18, and the end, without the nut, of the positioning bolt 11 penetrates through the two opposite side walls of the U-shaped clamping slot 18 and is fastened through the nut.

In the embodiment, both the third side 102 of the multiple sides and each collection pipe 4 are made of transparent materials, the third side 102 is arranged between the first side 101 and the second side, and two ends of the third side 102 are fixedly connected with the first side 101 and the second side respectively. Therefore, a user can observe the snow particle collecting condition of snow collecting pipes through the third side 102 of the shell 1, and the measuring time can be conveniently determined. Additionally, in order to reduce interference with airflow, the first side of the shell is streamlined.

In the embodiment, in order to intuitively know the volume of snow particles in the collection pipe 4, scale lines are arranged on each collection pipe 4 along an axis direction of the collection pipe 4. The scale lines in the embodiment are specifically used for indicating the height of the collection pipe.

In the embodiment, specifically, the support frame 6 is fixedly connected with the ground through other bolts.

In the embodiment, in order to conveniently judge the incoming flow direction of snow drift, the device further comprises a wind indicator. Specifically, the wind indicator is arranged on the support frame 6.

Figure 8:
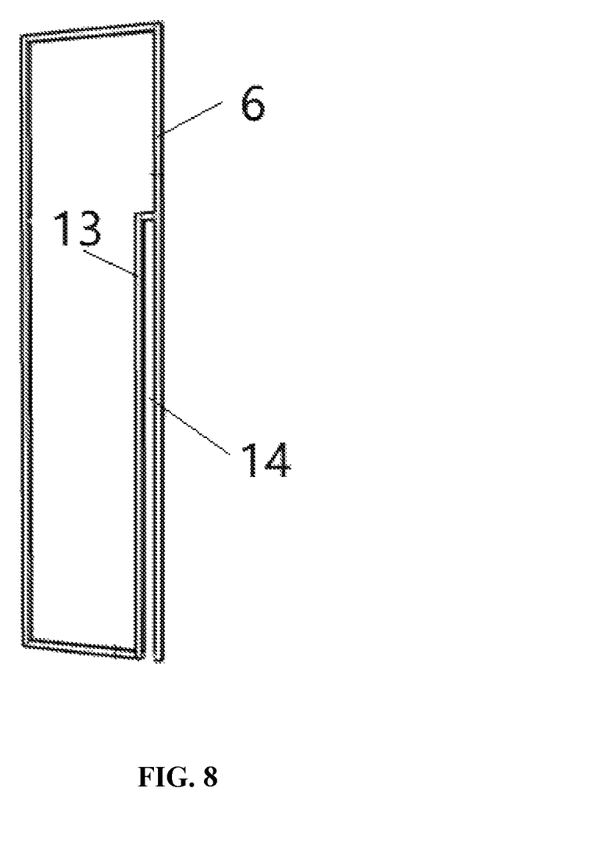
FIG. 8 is a structural schematic diagram of a support frame of a measuring device for snow flux and accumulated snow density at different heights provided in the embodiment of the present disclosure.
Figure 9:
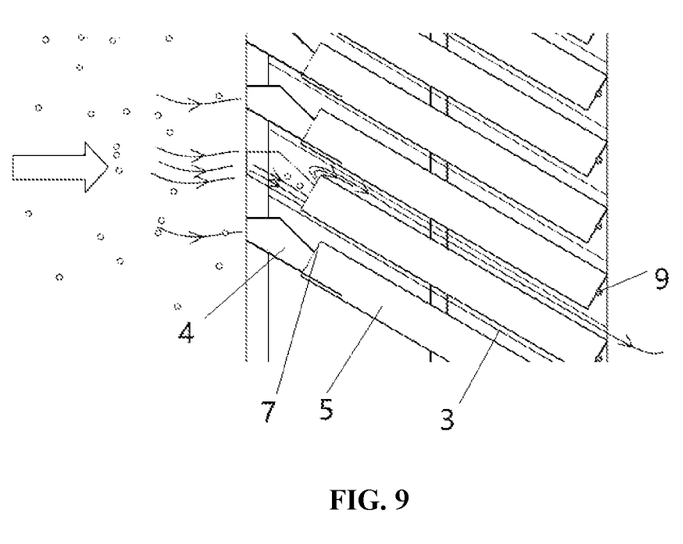
FIG. 9 is a schematic diagram of internal airflow direction of a shell of a measuring device for snow flux and accumulated snow density at different heights provided in the embodiment of the present disclosure.

In the embodiment, as shown in FIG. 8, an auxiliary support 13 is arranged on the support frame 6, an inverted U-shaped clamping part 14 is defined by the auxiliary support 13 and the support frame 6, the inverted U-shaped clamping part 14 extends upwards a bottom end of the support frame 6 along a height direction of the support frame 6, the shell 1 is clamped in the inverted U-shaped clamping part 14, and the collection port 2 and the air outlet 8 are respectively formed in two opposite sides of the inverted U-shaped clamping part 14. Through the arrangement, the shell 1 and the support frame 6 are convenient to disassemble and assemble.

A snow flux and accumulated snow density measuring method by using the measuring device for snow flux and accumulated snow density at different heights specifically comprises the following steps:

step one, carrying out preparation work before testing, including transporting the components of the measuring device for snow flux and accumulated snow density at different heights to a test site, assembling collection devices (namely inserting collection pipes 4 into designated positions of storage pipes 5), and testing the reliability and accuracy of an anemoclinograph 10;

step two, selecting a proper test position at the test site, integrally assembling the measuring device for snow flux and accumulated snow density at different heights, and fixing the measuring device for snow flux and accumulated snow density at different heights on the ground of the test position according to a wind indicator, so that collection ports 2 and the first ends of the collection pipes 4 face the wind;

step three, recording the starting time of measurement, and opening the anemoclinograph 10 to measure and record meteorological information;

step four, determining proper measurement time ΔT (the test time ΔT is 5-30 min, and the specific time should be determined according to the snow drift conditions of the site), weighing the collected snow particles after measurement, namely taking out snow collecting pipes in sequence, and recording the volume Vi and the mass mi of the collected snow particles; and step five, collating collected and measured data including meteorological data collected by the anemoclinograph 10 in the measuring time and the measured volume and mass of the collected snow particles (the measurement of the volume of the collected snow can be calculated through scales on the storage pipes 5, and the measurement of the mass of the collected snow is measured through an electronic balance), and then determining the flux and the accumulated snow density of the snow particles at different heights.

It needs to be noted that the measuring device for snow flux and accumulated snow density at different heights provided by the embodiment is suitable for collecting sand grains at different heights in the wind-drift sand environment at the same time.

Specific examples are used for illustration of the principles and implementation methods of the present disclosure. The description of the above-mentioned embodiments is used to help illustrate the method and the core principles of the present disclosure; and meanwhile, those skilled in the art can make various modifications in terms of specific embodiments and scope of application in accordance with the teachings of the present disclosure. In conclusion, the content of this specification shall not be construed as a limitation to the present disclosure.

What is claimed is:

1. A device for measuring snow flux and accumulated snow density at different heights, comprising:
    a shell including multiple sides, a first side of the multiple sides is provided with a plurality of collection ports along a height direction of the shell;
    a plurality of collection devices arranged in the shell, each of the plurality of collection devices including a collection pipe with a first end and a second end, a storage pipe with a first end and a second end and a fixed bolt;
    a plurality of partition plates, each of the plurality of partition plates arranged between every two adjacent collection devices of the plurality of collection devices; and
    a support frame,
    wherein the first end of each collection pipe is horizontally arranged,
    the collection pipe and the collection port of the plurality of collection ports are in one-to-one correspondence,
    the first end of each collection pipe is arranged in one collection port of the plurality of collection ports,
    the second end of each collection pipe and each storage pipe are both obliquely arranged downwards,
    the second end of each collection pipe and the first end of each storage pipe are detachably connected and communicate with each other,
    the second end of each storage pipe is sealed,
    each fixed bolt penetrates through the shell and is fastened through a first nut,
    the second end of each storage pipe is supported on the fixed bolt,
    the shell is detachably connected with the support frame, and
    the support frame is detachably connected with ground;
    the second end of each collection pipe is embedded into the first end of each storage pipe,
    an air outlet gap is positioned between the second end of each collection pipe and the first end of each storage pipe,
    a plurality of air outlets are formed in a second side of the multiple sides along the height direction of the shell,
    the first side and the second side are oppositely arranged,
    the plurality of air outlets and the plurality of the collection devices are in one-to-one correspondence, and
    each of the plurality of air outlets corresponds to the second end of each storage pipe.

2. The device according to claim 1, wherein the device also comprises a meteorological information collection assembly used for collecting meteorological information, and the meteorological information collection assembly is arranged on the support frame.

3. The device according to claim 2, wherein the meteorological information collection assembly comprises an anemoclinograph.

4. The device according to claim 3, the device further comprises a mounting box, a mounting rack and positioning bolts, wherein the mounting box is fixedly connected with the mounting rack, an opening is formed in a top end of the mounting box, the anemoclinograph is inserted into the mounting box from the opening, the mounting rack is provided with a clamping slot, and the clamping slot is clamped to the support frame and fixedly connected with the support frame through the positioning bolts.

5. The device according to claim 1, wherein both a third side of the multiple sides and each collection pipe are made of transparent materials, the third side is arranged between the first side and the second side, and two ends of the third side are fixedly connected with the first side and the second side respectively.

6. The device according to claim 5, wherein scale lines are arranged on each collection pipe along an axis direction of the collection pipe.

7. The device according to claim 1, wherein the support frame is fixedly connected with the ground through other bolts.

8. The device according to claim 1, the device further comprises a wind indicator.

9. The device according to claim 1, wherein an auxiliary support is arranged on the support frame, an inverted U-shaped clamping part is defined by the auxiliary support and the support frame, the inverted U-shaped clamping part extends upwards a bottom end of the support frame along a height direction of the support frame, the shell is clamped in the inverted U-shaped clamping part, and the collection port and the air outlet are respectively formed in two opposite sides of the inverted U-shaped clamping part.

* * * * *